UNITED STATES PATENT OFFICE 2,533,172

HYDROLYSIS OF VINYL ETHERS

Clyde McKinley, Phillipsburg, N. J., assignor to General Aniline & Film Corporation, New York, N. Y., a corporation of Delaware No Drawing. Application June 28, 1946,
Serial No. 680,090

10 Claims. (Cl. 260—601)

This invention relates to a method of producing carbonyl compounds, aldehydes and ketones by hydrolysis, in vapor phase, of vinyl and similar ethylenically unsaturated ethers of the following general formula:

$$R^1CH=CR^2-O-R$$

in which R, $R^1$ and $R^2$ may be an alkyl, aryl or aralkyl radical and $R^1$ and $R^2$ may also be hydrogen.

It has heretofore been proposed to hydrolyze vinyl ethers of this type by mixing the ether with a dilute acid such as 1 to 5% sulfuric acid at a slightly elevated temperature. While such liquid phase hydrolysis may be carried out with good yields, a number of secondary reactions may occur, such as a certain amount of the polymerization of the ethers which represent a loss of the same.

In accordance with the present invention, ethylenically unsaturated ethers of the above-mentioned type are hydrolyzed by contacting the vapors thereof in admixture with water vapor with a suitable catalyst in order to convert the same into an aldehyde or ketone and an alcohol in accordance with the following equation:

$$R^1CH=CR^2-O-R + HOH \longrightarrow R^1CH_2-\overset{O}{\underset{\|}{C}}-R^2 + ROH$$

By proper selection of the catalyst, temperature, molar ratio of ether to water and contact time of the reactants with the catalyst, as more fully hereinafter described, the hydrolysis may be carried out with good yields, 98–100%, and in addition, secondary reactions and the formation of undesirable by-products may be avoided.

The present invention is of particular interest for the production of acetaldehyde and from a consideration of the nature of the reaction, it will be apparent that a vinyl ether must be employed for its production. As examples of suitable vinyl ethers for the production of acetaldehyde in accordance with the present invention, may be mentioned the vinyl ethers of such lower aliphatic alcohols as methyl, ethyl, propyl, isobutyl, butyl, allyl, hexyl, cyclohexyl, and the like. While the vinyl ethers of lower aliphatic alcohols are preferred, particularly methyl or ethyl vinyl ether, since vinyl ethers of this type may readily be produced at relatively low cost and due to their low molecular weight, a smaller amount of material by weight is processed when methyl or ethyl vinyl ether is employed as the starting material for the production of acetaldehyde than is otherwise the case, the process is operative and good yields can be obtained when the vinyl ethers of such higher aliphatic alcohols as lauryl-, heptadecyl-, octadecyl-, oleyl-vinyl ether and the like; or the vinyl ethers of aromatic hydroxy compounds, such as phenol, naphthol, benzyl alcohol and the like, are used. The process of the present invention is also applicable to the production of higher aldehydes, and in this case, it is apparent that an ethylenically unsaturated ether in which $R^1$ in the formula given above is an alkyl, aryl or aralkyl group must be employed. As examples of such ethylenically unsaturated ethers may be mentioned the ethers of alcohols of the type heretofore mentioned with such ethylenically unsaturated alcohols as propenyl, butenyl and their higher homologues, styrenyl alcohol and the like. The process of this invention is also applicable to the production of ketones, and in this case, it will be apparent that $R^2$ in the above formula must be an alkyl, aryl or aralkyl group. As examples of ethylenically unsaturated alcohols of this type whose ethers with alcohols of the type heretofore mentioned, especially the lower aliphatic alcohols, may be employed for the production of ketones in accordance with this invention, may be mentioned such ethylenically unsaturated alcohols as isopropenyl, isobutenyl, α-phenyl or α-benzyl vinyl alcohols.

It should also be understood that the present invention is applicable not only to the treatment of relatively pure ethers of the type heretofore specified but also to the treatment of ethers containing substantial amounts of impurities or by-products of the reaction by which the vinyl ethers have been produced. Specifically, it should be noted that the process of the present invention is applicable to the treatment of vinyl ethers containing substantial amounts of such compounds as acetals, alcohols, acetylene, ethylene and other low boiling, saturated or unsaturated hydrocarbons and the like.

As is apparent from the nature of the reaction, a molar ratio of water to vinyl ether which is employed must be at least 1:1 in order for complete hydrolysis to be effected. However, the hydrolysis proceeds at an appreciable rate when the admixture contacted with the catalyst contains as little as ½ mole of water to each mole of vinyl ether. It has been found, however, that when relatively small amounts of water are employed, there is a tendency for substantial amounts of acetal to be formed during the hydrolysis so that if the production of acetal is undesirable, a slight excess of water over that theoretically necessary for complete hydrolysis of the ethers should be employed. It is therefore preferred, in order to avoid the formation of acetals during the hydrolysis, to employ 2 to 4 moles of water to each mole of ether since at this ratio, the formation of acetal is negligible and in addition, the water vapor present helps to carry away the exothermic heat of reaction. While larger amounts of water do not interfere with the hydrolysis reaction, they are unnecessary and only constitute a load on the system unless the material to be hydrolyzed contains substantial amounts of acetal or alcohol. In this case, an increased amount of water is desirable in order to insure simultaneous hydrolysis of both the ether and acetal or prevent formation of acetal in case a substantial amount of free alcohol is present. However, it will generally be found more economical in case the mixture to be hydrolyzed contains more than a few per cent of acetal or free alcohol to first separate the ether from the acetal or alcohol and separately hydrolyze the ether and acetal, rather than attempt to carry out their simultaneous hydrolysis by incorporation of substantial excesses of water.

The temperature employed for the hydrolysis may be varied through a relatively wide range. In order to obtain a satisfactory rate of hydrolysis, a temperature of at least 80° C. should be employed. On the other hand, it is desirable to carry out the hydrolysis at as low a temperature as possible in order to avoid side reactions such as dehydration and dehydrogenation and therefore, temperatures above 200° C. are preferably avoided. The process is operative, however, at temperatures ranging from 30° C. up to about 250° C. The reaction may advantageously be run at atmospheric pressure but in the case of higher boiling vinyl ethers such as octadecyl vinyl ether and the like, a reduced pressure may be advantageous in order to avoid too high a temperature of reaction and the accompanying undesirable side reactions. Likewise, higher pressures, that is up to, say 150 lbs. per square inch, may be advantageous in handling methyl vinyl ether and other relatively low boiling vinyl ethers. Higher pressures also may be advantageous, in case the vinyl ether being hydrolyzed contains a substantial amount of acetal, in shifting the equilibrium in favor of the hydrolysis of acetal to acetaldehyde and alcohol. It is also desirable to carry out the reaction at a temperature and pressure at which the water will not condense and deposit on the catalyst since the presence of liquid water on the catalyst has been found to seriously interfere with its catalytic activity. For this reason, at temperatures below 100° C., the process is carried out under reduced pressure.

The present invention will be fully understood from a consideration of the following specific examples of a preferred method of practicing the same:

EXAMPLE 1

Methyl vinyl ether was vaporized and mixed with steam in the ratio of 2.9 mols of steam for each mol of methyl vinyl ether. The mixed ether and steam were then heated to 150° C. and passed at a space velocity (grams of ether per hour per gram of catalyst) of 0.801 or a contact time of 1.92 seconds over a 10% tungstic oxide on alumina catalyst having a sodium ion concentration less than 0.01%. The hydrolysis of the methyl vinyl ether to acetaldehyde and methanol proceeded smoothly, the reaction being exothermic but not excessively so, so that the removal of the heat of reaction presented no unusual difficulties. The reaction products were condensed and separated by distillation. It was found that 100% of the methyl vinyl ether had been converted to acetaldehyde and methanol and that the reaction products were readily separable by distillation and formed no azeotropic mixtures.

While the foregoing is a description of a preferred manner of converting methyl vinyl ether to acetaldehyde and methanol, it will be understood that various modifications may be made in such process variables as the water : ether ratio; catalyst, contact time and temperature without departing from the scope of this invention. In order to fully describe the present invention, the principal effects of such permissible variations are described in greater detail below. Thus, it was found that when the water : ether ratio was varied from that described above while other conditions of reaction were maintained constant, the per cent of conversion of methyl vinyl ether to acetaldehyde and methanol dropped to about 94% when a water : ether ratio of 1.07 was employed. The per cent of conversion steadily increased as the water : ether ratio was increased, until substantially complete conversion was obtained when the water : ether ratio was about 2. Further increase in the water : ether ratio up to as high as a ratio of 8:1 was without effect on the per cent of conversion obtained and in general, a water : ether ratio of between 2:1 and 4:1 is preferred.

It has also been found that a wide variety of catalysts are active for the hydrolysis of methyl vinyl ether to acetaldehyde and methanol and it is believed that any acid catalyst which is either a solid at the temperature of reaction or deposited on a solid carrier is effective for this purpose. Among the catalysts which have been tested for this purpose and with which 100% conversion has been obtained under the conditions outlined in the first paragraph of this example, may be mentioned solid dehydration acid catalysts, e. g., acid-washed silica gel, silica gel impregnated with phosphoric acid, acid-washed alumina, molybdena on alumina, chromic oxide on alumina, vanadium oxide on pumice and a wide variety of inert carriers which have been washed with such mineral acids as sulfuric acid or hydrochloric acid—for instance, pumice, montmorillonite and others. While high rates of conversion are obtained with a wide variety of catalysts, it has been found that tungstic oxide is particularly valuable for the hydrolysis of vinyl ethers, since it maintains its activity for long periods of time. The life of the various other catalysts which have been employed is illustrated in the following Table 1:

*Table 1*

CATALYST LIFE

| Run | Catalyst | $\frac{\text{Mol Water}}{\text{Mol Ether}}$ | Space Velocity | Contact Time Seconds | Temp. ° C. | Hour on Stream; Per Cent Conversion | | | |
|---|---|---|---|---|---|---|---|---|---|
| A | Silica Gel | 2.71 | 1.07 | 1.42 | 180 | $\frac{3}{100}$ | $\frac{12}{91}$ | $\frac{20}{73}$ | $\frac{24}{47}$ |
| B | 10% Molybdic Oxide on Alumina | 2.69 | .92 | 1.73 | 160 | $\frac{50}{96}$ | $\frac{100}{92}$ | $\frac{200}{84}$ | $\frac{300}{76}$ |
| C | Montmorillonite | | | | | $\frac{20}{100}$ | $\frac{40}{95}$ | $\frac{100}{81}$ | $\frac{150}{70}$ |

While a wide variety of acid catalysts have been found to be operative for the hydrolysis of vinyl and similar ethylenically unsaturated ethers to aldehydes or ketones and alcohols, it has been found that in order to obtain maximum conversion the catalyst employed should have a low sodium or other alkali metal or alkaline earth metal ion concentration. Thus, when the alkali metal ion concentration of the catalyst is less than 0.01%, essentially quantitative yields of aldehyde or ketone have been obtained with practically all acid-type catalysts which have been tested. However, many of these catalysts show a marked decrease in yield as the alkali ion concentration is increased. Tungstic oxide, however, was found to be unique from the other catalysts tested in that it is markedly less sensitive to the presence of alkali ions. However, while employing a 10% tungstic oxide on alumina catalyst, in which the sodium concentration was as high as 0.1%, there was some polymerization of the aldehyde, resulting in the formation of crotonaldehyde and acetaldehyde polymer during the hydrolysis. The polymer which was formed deposited on the catalyst and thus lowered its activity. As the sodium ion concentration of a 10% tungstic oxide on alumina catalyst was increased to .25% under the operating conditions specified in the first paragraph of this example, only 65% of the methyl vinyl ether was hydrolyzed, and in order to obtain complete hydrolysis a temperature of 170° C. was necessary. While satisfactory operation was thus obtained with tungstic oxide which had a sodium ion concentration as high as 0.25%, with other catalysts such as acid-washed silica gel or silica gel impregnated with phosphoric acid in which the sodium ion concentration was greater than 0.1%, satisfactory operation could not be obtained and, as indicated above, the operation is improved, even with tungstic oxide, if the catalyst has a low sodium ion concentration. In practicing the present invention, it is therefore desirable that the catalyst employed have a sodium or other alkali metal or alkaline earth metal ion concentration at least less than 0.1% and preferably less than 0.01%. It has been found that catalysts having relatively high sodium ion concentrations can be readily adopted for use in the process of the present invention by washing them with a dilute solution of a strong mineral acid, such as 1% or 2% solutions of sulfuric or hydrochloric acid. When so treated, the alkali ion present in the catalyst is removed or neutralized and satisfactory yields are obtained, essentially quantitative yields being obtained when the alkali ion concentration of the catalyst is less than 0.01%.

The effect of contact time upon the conversion of methyl vinyl ether to acetaldehyde and methanol was studied in a series of runs, using a low sodium ion tungstic oxide on alumina catalyst at a temperature of 150° C. and a water: ether ratio of approximately 3:1. It was found that contact times of between one and two seconds are desirable in order to obtain substantially complete conversion. The effect of the contact time on the per cent of conversion is illustrated in the following Table 2:

Table 2
EFFECT OF CONTACT TIME

| Run No. | $\frac{\text{Mol Water}}{\text{Mol Ether}}$ | Space Velocity, Gram of Ether per hour per Gram of Catalyst | Contact Time, Seconds | Temp., °C. | Per Cent Conversion Of Ether |
|---|---|---|---|---|---|
| 1 | 2.72 | 0.80 | 2.02 | 150 | 100 |
| 2 | 2.91 | 1.54 | 1.0 | 150 | 98.7 |
| 3 | 2.79 | 2.13 | 0.74 | 150 | 97 |
| 4 | 2.80 | 2.42 | 0.66 | 150 | 96.5 |
| 5 | 3.28 | 2.76 | 0.51 | 150 | 95.7 |
| 6 | 2.51 | 4.82 | 0.354 | 150 | 94 |
| 7 | 2.83 | 13.3 | 0.118 | 150 | 85 |
| 8 | 2.88 | 15.8 | 0.098 | 150 | 79 |

The particular temperature employed for the reaction will vary somewhat with the contact time and with the particular catalyst being employed. Temperatures of between 100° C. and 200° C. have been found to be operative for the process. At atmospheric pressure, it is desirable to employ a reaction temperature of at least 125° C. in order to insure that no water will be deposited in liquid form on the catalyst, since the presence of liquid water on the catalyst has been found to lessen its activity. As the temperature is increased, the possibility of various side reactions, particularly dehydration, increases and at temperatures above 200° C. these side reactions become quite noticeable so that higher temperatures preferably are avoided.

EXAMPLE 2

Ethyl vinyl ether was vaporized and mixed with steam in a molar ratio of 1:5 and the mixture heated to 150° C. and passed at this temperature over 10% tungstic oxide on alumina catalyst having a sodium ion concentration less than 0.01%. A space velocity of .58 was used. It was found that the ethyl vinyl ether was completely converted to acetaldehyde and ethanol. Several other experiments were carried out, employing ethyl vinyl ether as the starting material and the effect of the various variables, such as relative proportions of ether and water, contact time, catalyst and temperature appeared to be substantially parallel to the effects of these variables in the hydrolysis of methyl vinyl ether.

EXAMPLE 3 n-Butyl vinyl ether was mixed with steam in the molar ratio of 1:2.75 and the mixture heated to 150° C. passed at a space velocity of .866 over tungstic oxide on alumina catalyst having a sodium ion concentration less than 0.01%. It was found that 70% of the n-butyl vinyl ether was converted to acetaldehyde and butanol. Other reactions in the hydrolysis were prominent and these reactions became more pronounced at higher temperatures. The effect of the several variables in the process appeared to be substantially parallel in their effect in the hydrolysis of methyl vinyl ether.

EXAMPLE 4

In addition to producing acetaldehyde from relatively pure vinyl ethers, a mixture of impure methyl vinyl ether containing dimethyl acetal, methanol and ethylene obtainable by vinylation of methanol with acetylene containing ethylene in the presence of a basic catalyst as disclosed in U. S. Patent No. 2,066,076 was passed at 150° C. in admixture with water over a low sodium ion 10% tungstic oxide on alumina catalyst. The molal proportions of the methyl vinyl ether dimethyl acetal, methanol, ethylene and water in the feed to the catalyst were 2.0 to 0.3 to 1.0 to 2.3 to 6.0 respectively. The contact time was 1.65 seconds. The reaction products were condensed and distilled and it was found that 46 per cent of the dimethyl acetal and 97 per cent of the methyl vinyl ether had been hydrolyzed to acetaldehyde and methanol.

EXAMPLE 5

A sample of isopropenyl methyl ether was hydrolyzed under conditions comparable to those employed in the hydrolysis of methyl vinyl ether; that is, the ether and water were vaporized and mixed in molar proportions of 1:3 and the mixture heated to 150° C. passed over tungstic oxide on alumina catalyst having a sodium ion concentration less than 0.01%, a contact time of 2 seconds being employed. The product was collected and distilled for analysis and no unreacted ether was observed on distillation, and it was found that the ether had been cleanly hydrolyzed to acetone and methanol with no side reactions, the yield being practically quantitative.

I claim:

1. The method of hydrolyzing ethylenically unsaturated ethers of the formula:

$$R'-\underset{\underset{H}{|}}{C}=\underset{R^2}{C}-OR$$

in which R' and R² stand for a member of the group consisting of hydrogen and alkyl, aryl and aralkyl radicals and R stands for a member of the group consisting of alkyl, aryl and aralkyl radicals, which comprises contacting such ethers in vapor phase in admixture with steam with a solid dehydration acid catalyst selected from the group consisting of molybdic oxide and tungstic oxide having an alkali ion concentration less than 0.1% at an elevated temperature.

2. The process of producing acetaldehyde by hydrolysis of a vinyl ether of a lower aliphatic alcohol, which comprises contacting such ether in vapor phase in admixture with steam with a solid dehydration acid catalyst selected from the group consisting of molybdic oxide and tungstic oxide having an alkali ion concentration less than 0.1% at a temperature of from 80° to 200° C.

3. The process as defined in claim 2, wherein the vinyl ether is methyl vinyl ether.

4. The process as defined in claim 2, wherein the vinyl ether is ethyl vinyl ether.

5. The process of producing acetaldehyde by hydrolysis of a vinyl ether of a lower aliphatic alcohol, which comprises contacting such ether in vapor phase in admixture with steam with a solid dehydration acid catalyst selected from the group consisting of molybdic oxide and tungstic oxide having an alkali ion concentration less than 0.01% at a temperature of from 80° to 200° C.

6. The process as defined in claim 5, wherein the vinyl ether is methyl vinyl ether.

7. The process as defined in claim 5, wherein the vinyl ether is ethyl vinyl ether.

8. The method of hydrolyzing ethylenically unsaturated ethers of the formula:

$$R'-\underset{\underset{H}{|}}{C}=\underset{R^2}{C}-OR$$

in which R' and R² stand for a member of the group consisting of hydrogen and alkyl, aryl and aralkyl radicals and R stands for a member of the group consisting of alkyl, aryl and aralkyl radicals, which comprises contacting such ethers in vapor phase in admixture with steam with tungstic oxide at an elevated temperature.

9. The method of producing acetaldehyde by hydrolysis of a vinyl ether of the formula $$H_2C=CH-O-R$$

in which R stands for a member of the group consisting of alkyl, aryl and aralkyl radicals which comprises contacting such ether in vapor phase in admixture with steam with tungstic oxide at a temperature of from 80° to 200° C.

10. The process of producing acetaldehyde by hydrolysis of a vinyl ether of a lower aliphatic alcohol, which comprises contacting such ether in vapor phase in admixture with steam with tungstic oxide at a temperature of from 80° to 200° C.

CLYDE McKINLEY.

REFERENCES CITED

The following references are of record in the file of this patent:

UNITED STATES PATENTS

| Number | Name | Date |
|---|---|---|
| 1,906,833 | Baur | May 2, 1933 |
| 2,046,556 | Groll | July 7, 1936 |
| 2,075,100 | Dreyfus | Mar. 30, 1937 |
| 2,246,569 | Brown | June 24, 1941 |

FOREIGN PATENTS

| Number | Country | Date |
|---|---|---|
| 496,840 | Great Britain | Dec. 7, 1938 |